United States Patent
Allen et al.

(10) Patent No.: US 9,712,638 B2
(45) Date of Patent: Jul. 18, 2017

(54) CREATING A DYNAMIC AGGREGATE GROUP PROFILE OF USERS IN AN ONLINE COLLABORATION SESSION FOR PROVIDING TAILORED CONTENT DELIVERY

(71) Applicant: INTERNATIONAL BUSINESS MACHINES CORPORATION, Armonk, NY (US)

(72) Inventors: Corville O. Allen, Morrisville, NC (US); Jeffrey D. Haggar, Holly Springs, NC (US); Eileen J. Min, Morrisville, NC (US); Michael M. Skeen, Raleigh, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/269,807

(22) Filed: May 5, 2014

(65) Prior Publication Data
US 2015/0319264 A1    Nov. 5, 2015

(51) Int. Cl.
*H04L 12/58* (2006.01)
*H04L 29/08* (2006.01)
*H04L 29/06* (2006.01)

(52) U.S. Cl.
CPC .......... *H04L 67/306* (2013.01); *H04L 12/588* (2013.01); *H04L 51/32* (2013.01); *H04L 65/403* (2013.01); *H04L 67/22* (2013.01)

(58) Field of Classification Search
CPC ........ H04L 12/588; H04L 51/32; H04L 67/22
See application file for complete search history.

(56) References Cited

U.S. PATENT DOCUMENTS

| | | | |
|---|---|---|---|
| 8,380,691 B1* | 2/2013 | Tunguz-Zawislak | G06Q 50/01 707/705 |
| 2008/0103907 A1* | 5/2008 | Maislos | G06F 17/30867 705/14.54 |
| 2008/0267091 A1* | 10/2008 | Parkkinen | H04L 12/66 370/255 |
| 2011/0055017 A1* | 3/2011 | Solomon | G06Q 30/02 705/14.66 |

(Continued)

FOREIGN PATENT DOCUMENTS

| | | |
|---|---|---|
| EP | 2546794 A1 | 1/2013 |
| WO | WO 2012/056463 A1 | 5/2012 |

OTHER PUBLICATIONS

"Facebook Announces Page Post Targeting", Edelman Digital, Aug. 1, 2012, printed from online: http://www.edelmandigital.com/2012//08/01/facebook-announces-page-post-targeting/, pp. 1-5.

(Continued)

*Primary Examiner* — Jeong S Park
(74) *Attorney, Agent, or Firm* — Scully, Scott, Murphy & Presser, P.C.; Robert C. Bunker

(57) ABSTRACT

There are provided a system, a method and a computer program product for suggesting content to a group. The system identifies a group of users in a social network. The system receives inputs associated with the social network group. The system aggregates the received inputs. The system analyzes the aggregated inputs. The system searches, based on the aggregation and the analysis, one or more tailored content to be delivered to the group in Internet, one or more database and one or more data warehouse. The system delivers the tailored content to the group in the social network.

10 Claims, 4 Drawing Sheets

(56) References Cited

U.S. PATENT DOCUMENTS

| | | | | |
|---|---|---|---|---|
| 2011/0106972 | A1* | 5/2011 | Grube | G06F 13/1668 |
| | | | | 709/238 |
| 2012/0095976 | A1* | 4/2012 | Hebenthal | G06F 17/30867 |
| | | | | 707/706 |
| 2013/0060849 | A1 | 3/2013 | Zimmet et al. | |
| 2013/0097271 | A1* | 4/2013 | He | H04L 12/581 |
| | | | | 709/206 |
| 2013/0290439 | A1* | 10/2013 | Blom | G06Q 50/01 |
| | | | | 709/206 |
| 2014/0089048 | A1* | 3/2014 | Bruich | G06Q 30/0201 |
| | | | | 705/7.32 |
| 2014/0122584 | A1* | 5/2014 | Gargi | G06Q 50/01 |
| | | | | 709/204 |
| 2014/0330651 | A1* | 11/2014 | Klemm | G06Q 30/0269 |
| | | | | 705/14.66 |
| 2014/0337421 | A1* | 11/2014 | Edlund | H04L 67/22 |
| | | | | 709/204 |
| 2015/0112778 | A1* | 4/2015 | Feldman | G06Q 30/0269 |
| | | | | 705/14.16 |
| 2015/0281163 | A1* | 10/2015 | Bastide | H04L 51/32 |
| | | | | 709/206 |
| 2016/0255170 | A1* | 9/2016 | Gargi | G06Q 30/0269 |
| | | | | 709/204 |

OTHER PUBLICATIONS

List of IBM Patents or Patent Applications Treated as Related dated Nov. 11, 2015, 2 pages.
U.S. Appl. No. 14/615,641, filed Feb. 6, 2015.

* cited by examiner

CREATING A DYNAMIC AGGREGATE GROUP PROFILE OF USERS IN AN ONLINE COLLABORATION SESSION FOR PROVIDING TAILORED CONTENT DELIVERY

BACKGROUND

This disclosure relates generally to delivering content to a group of users, and particularly to delivering content to a group of users based on one or more profile of the group.

BACKGROUND OF THE INVENTION

In a social network, users may engage in group interactions, for example, an online forum discussion or a real-time online chat, and may share content or engage in activities together. Currently, an individual user may manually choose particular content (e.g., ringtone, e-book, MP3 file, etc.), e.g., via an online application store. Then, a corresponding sever device that hosts the online application store delivers the chosen content to the individual user, e.g., via one or more communication network.

SUMMARY

There are provided a system, a method and a computer program product for suggesting content to a group. In one embodiment, the system identifies a group of users in a social network. The system receives inputs associated with the social network group. The system aggregates the received inputs. The system analyzes the aggregated inputs. The system searches, based on the aggregation and the analysis, one or more tailored content to be delivered to the group in Internet, one or more database and one or more data warehouse. The system delivers the tailored content to the group in the social network.

In order to analyze the aggregated inputs, in one embodiment, the system classifies the aggregated inputs. The system identifies, based on the classification, a common interest, a common preference and a common need of the one or more users in the social network group. The system further identifies, based on the classification, a common interest, a common preference and a common need of a majority of the one or more users in the social network group.

In one embodiment, the method for suggesting content to a group comprises identifying a group of users in a social network. Inputs associated with the social network are received. The received inputs are aggregated. The aggregated inputs are analyzed. One or more tailored content to be delivered to the group is searched, based on the aggregation and the analysis, in Internet, one or more database and one or more data warehouse. The tailored content is delivered to the group in the social network.

In one embodiment, a computer program product for suggesting content to a group comprises a computer readable storage medium. The computer readable storage medium is readable by a processing circuit and stores instructions run by the processing circuit. The instructions identify a group of users in a social network. The instructions receive inputs associated with the social network group. The instructions aggregate the received inputs. The instructions analyze the aggregated inputs. The instructions search, based on the aggregation and the analysis, one or more tailored content to be delivered to the group in Internet, one or more database and one or more data warehouse. The instructions deliver the tailored content to the group in the social network.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION

When an online collaborative session (e.g. a social network group interaction, a group chat, etc.) among a number of contacts (i.e., users) in a social network takes place, a tailored content can be delivered to the contacts, e.g., via the social network. Based on commonalities (e.g., common interests, etc.) in profiles of the users involved in the online collaborative session along with users' common activity history, the social network group can be characterized for a targeted content suggestion that is most relevant to that group as a whole. Accordingly, contents delivered to the group may also be further tailored to be a particular content type to meet an aggregated preference of the users based on content consumption history of the users, e.g., news articles read by one or more of the users during a last month.

Figure 1:
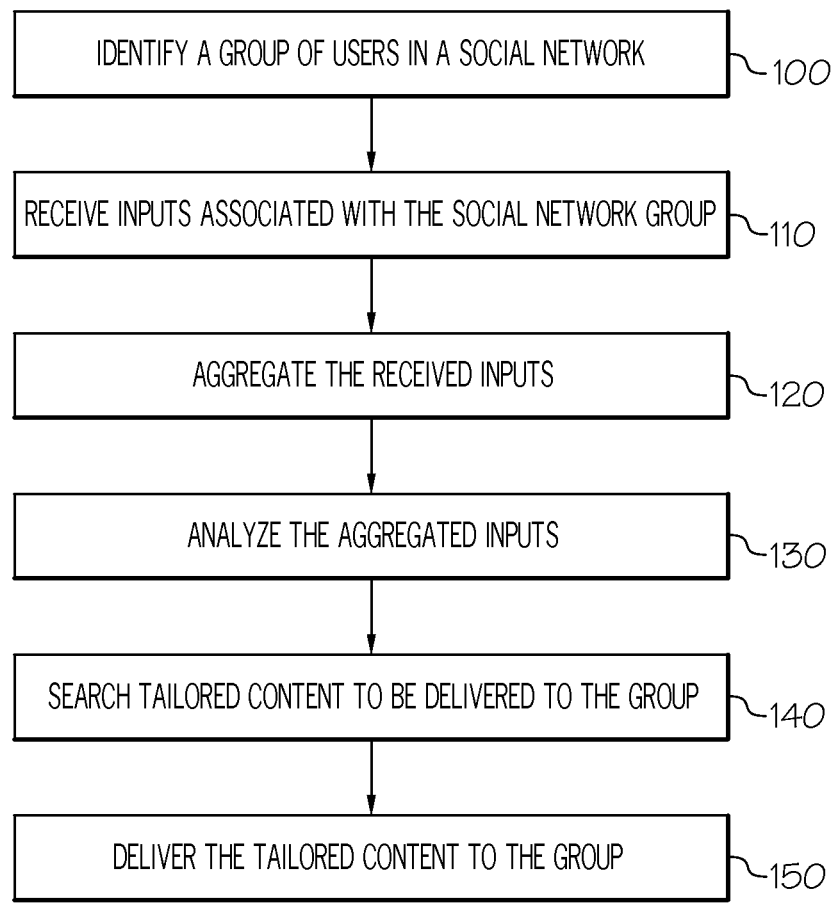
FIG. 1 illustrates a flowchart that describes a method for suggesting content to a social network group in one embodiment.

There are provided a method, a system and a computer program product for suggesting tailored content to users in a group based on a group profile which may be dynamically updated as one or more users join or leave the group. A computing system (e.g., a computing system shown in FIG. 3) may create the group profile of the users, e.g., by aggregating (e.g., a method shown in FIG. 2 described below) individual user profiles and further identifying commonalities of the users in the aggregated user profiles. FIG. 1 illustrates a flowchart for suggesting tailored content to a social network group in one embodiment. At 100, the computing system identifies a group of users in a social network, e.g., by using a web address (for example, a uniform resource locator that locates a web page on the Internet or the like) of a social network page which corresponds to the social network group. One or more users in the social network group may provide that web address to the computing system. In a further embodiment, the computing system identifies a subgroup within the social network group, e.g., by using a web address of a social network page that corresponds to the subgroup. One or more users in the social network subgroup may provide the web address of the social network subgroup to the computing system. In one embodiment, the computing system may be a server device hosting the social network. In another embodiment, the computing may be a computer associated with the social network.

At 110, the computing system receives inputs associated with the social network group, e.g., from a server device hosting the social network or from a database (not shown) associated with the social network. The received inputs include, but are not limited to: (1) social network postings (e.g., comments, status postings, etc.) of one or more of the users in the social network group, which are stored in the server device hosting the social network; (2) previous or real-time chat sessions of the one or more users in the social network group, which have been stored in the server device hosting the social network; (3) photographs of the one or more users in the social network group, which are stored in the server device hosting the social network; (4) previous or real-time videos of the one or more users in the social network group, which have been stored in the server device hosting the social network; (5) profile data of the one or more users in the social network group, which are stored in the server device hosting the social network; and (6) previous or real-time interaction data of the one or more users in the social network group, which have been stored in the server device hosting the social network.

The profile data of the one or more users include, but is not limited to: (a) data representing ages of the one or more users; (b) data representing current or previous geographic locations of the one or more users; (c) data representing interests of the one or more users; and (d) data representing hobbies or likeness of the one or more users. In a further embodiment, the computing system may create a single or multiple group profile(s) or concept(s), e.g., by aggregating the received inputs and identifying commonalities of the users in the aggregated inputs. For example, assume that a social network group is formed to share an activity, e.g., golfing, etc. Most of users in that social network group may indicate "golf" as hobbies, e.g., by selecting an icon (not shown) corresponding to the "golf" when creating a profile of each user in the social network. By receiving all the profile data of the users in the social network group from the server device hosting the social network or the database associated with the social network, the computing system may determine that most of the users in the social network group are interested in the "golf." Then, the computing system may determine that a commonality of the social network group is the "golf." The computing system may include the "golf" in the group profile of the social network group.

In one embodiment, a social network group dynamically changes one or more users in the group, e.g., as a user joins or leaves the group. The computing system dynamically updates, in real-time, the received inputs in order to reflect the dynamically changed users in the group. For example, the computing system performs a dynamic real-time analysis of a current online discussion held in the social network, e.g., by running a method shown in FIG. 3 which is described below. The computing system may assign a uniform numerical weight to each user profile joined the current online discussion. The computing system may adjust a numerical weight of an existing profile of a social network group user as that social network group user leaves and/or joins the current online discussion. The computing system stores, e.g., in a data storage device, the uniform numerical weight and the adjusted numerical weight(s) corresponding to the social network group user(s) who leave and/or join the current online discussion.

Returning to FIG. 1, at 120, the computing system aggregates the inputs received at 110. In one embodiment, the computing system aggregates the received inputs as well as metadata of the received inputs. In this embodiment, the computing system may receive or retrieve the metadata of the received inputs, e.g., from the server device or the database of the social network. The metadata of the received inputs include, but is not limited to: (1) a day and time that the server device stored a corresponding received input in a storage device (not shown) or a database; (2) a GPS (Global Positioning System) coordinate of a current or previous location of each user in a corresponding social network group, etc.

Figure 2:
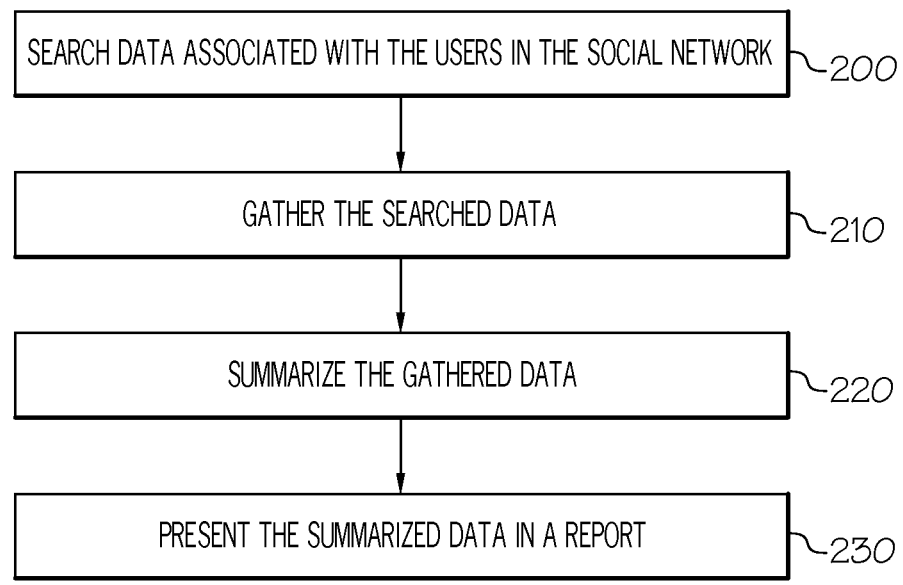
FIG. 2 illustrates a flowchart that describes a method for aggregating of inputs in one embodiment.

In one embodiment, in order to aggregate the received inputs (and the metadata of the received inputs), the computing system runs a method shown in FIG. 2. At 200, the computing system searches data, which is associated with the one or more social network group users, in the social network, Internet or one or more database which may be associated with the social network or other social network(s). In a further embodiment, the computing system accesses the database(s) of the social network or of the other social network(s), e.g., by automatically providing valid credential(s) to the social network and/or the other social network(s). The computing system may store the valid credentials, e.g., in a data storage device (not shown). The searched data include, but is not limited to: (1) the data same or similar to the received inputs; (2) additional data (e.g., email address(es), etc.) associated with the one or more users, etc.

Returning to FIG. 2, at 210, the computing system gathers the searched data, e.g., by storing electronic files of the searched data in a data storage device (not shown). At 220, the computing system summarizes the gathered data, e.g., by running content analysis or text mining software on the gathered data. At 230, the computing system presents the summarized data in a report. In one embodiment, the run content analysis or texting mining software outputs the summarized data as one or more reports.

Returning to FIG. 1, at 130, the computing system analyzes the aggregated inputs. The computing system analyzes the aggregated inputs, associated with a corresponding social network group, as a whole rather than analyzing data (e.g., a current geographic location, etc.) of an individual user. In one embodiment, in order to analyze the aggregated inputs as a whole, the computing system runs a method shown in FIG. 4. At 400, the computing system classifies the aggregated inputs, e.g., by applying a classification technique on the aggregated inputs. At 410, the computing system identifies, based on the classification, a common interest, a common preference, a common need, and a common geographic location of the one or more users. At 420, the computing system further identifies, based on the classification, a common interest, a common preference and a common need, and a common geographic location of a majority of the one or more users. For example, if a social network group is formed for enjoying hobbies together, individual profiles of users in the group may indicate the hobbies of the individual users. An individual user may indicate his/her hobby, e.g., in selecting one in a predetermined drop-down menu (not shown), which lists a plurality of hobbies, in a web page (not shown) used for creating his/her social network profile. The computing system may classify those users as one or more classes according to the hobbies indicated on the profiles. Each class may represent a particular hobby shared by members in that class. The computing system may identify the particular hobby, which the group represents, as a common interest of those members.

Returning to FIG. 1, at 140, the computing system searches, based on the aggregation (e.g., a method shown in FIG. 2) and the analysis (e.g., a method shown in FIG. 4), one or more tailored content to be delivered to the group in Internet, one or more database and one or more data warehouse. The computing system may store, e.g., in a data storage device, etc., valid credentials to access that one or more database and that one or more data warehouse. In order to access the database and the data warehouse, the computing system may automatically provide the stored valid credentials to the database and the data warehouse.

Figure 4:
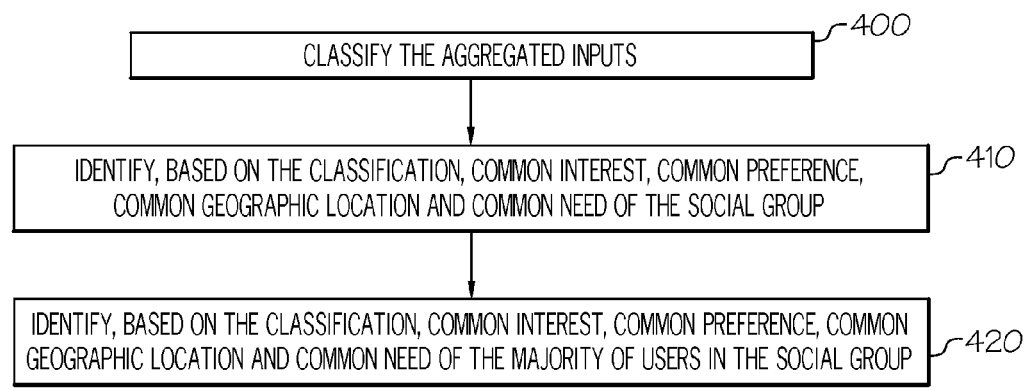
FIG. 4 illustrates a flowchart that describes a method for analyzing the aggregated inputs in one embodiment.

In one embodiment, in order to search the tailored content, the computing system runs an Internet search engine with a keyword found from the aggregation (e.g., a method shown in FIG. 2) and/or the analysis (e.g., a method shown in FIG. 4). In one embodiment, the found keyword represents one or more of: the common interest of the one or more users, the common preference of the one or more users, the common need of the one or more users, the common geographic location of the one or more users, the common interest of the majority of the one or more users, the common preference of the majority of the one or more users, the common geographic location of the majority of the one or more users, and the common need of the majority of the one or more users, which are identified at 410-420 in FIG. 4. After running the search engine with the found keyword, the computing system identifies one or more content which are included in a search result of the search engine. In this embodiment, the tailored content includes, but is not limited to: the one or more content included in the search result.

In one embodiment, the one or more content included in the search result includes, but is not limited to: one or more e-books, one or more online magazines, one or more online videos, one or more online news articles that correspond to one or more of: the common interest of the one or more users, the common preference of the one or more users, the common need of the one or more users, the common geographic location of the one or more users, the common interest of the majority of the one or more users, the common preference of the majority of the one or more users, the common geographic location of the majority of the one or more users, and the common need of the majority of the one or more users.

In another embodiment, in order to search the tailored content in the database or the data warehouse, the computing system may query the database or the data warehouse with the found keyword, e.g., by using SQL.

Returning to FIG. 1, at 150, the computing system delivers the tailored content, e.g., via the social network, etc., to the social network group. In order to deliver the tailored content, the computing system transmits, via the social network, the tailored content to the social network group during a real-time chat session of one or more users in the social network group and/or a real-time online interaction of the one or more users in the social network group.

In one embodiment, the computing system aggregates profile data, social network interaction data and social network postings (and metadata of the profile data, the interaction data and the postings), of a social network group or a subset of the group, e.g., by running a method shown in FIG. 2. The computing system normalizes those aggregated data to a common set of data points, e.g., by classifying the aggregated data and identifying a commonality represented by each class. The computing system further uses the common set of data points, e.g., the identified commonality, etc., to determine content and a type of that content to be provided to a corresponding social network group during a current online discussion or an active data stream shared by the corresponding social network group. For example, the common set of data points may indicate that the majority of users in the corresponding social network group prefer a particular content type, e.g., MP3 file, etc. The computing system transforms the tailored content to fit to the preferred content type, e.g., by verbally recording a written news article. The computing system delivers the tailored content in the preferred content type to the corresponding social network group, e.g., by sending a group email to the corresponding social network group with an attachment of the tailored content in the preferred content type.

The computing system provides content, associated with the commonalities found during the aggregation and the analysis, in the preferred type to a corresponding social network group. For example, if the corresponding social network group prefers to read a literature to obtain more information on what is being discussed in an online social network group discussion, the computing system may find one or more literature (instead of videos), e.g., by running an Internet search engine with a keyword of the online social network group discussion. The computing system may determine that keyword, e.g., by running content analysis software on texts exchanged during the online social network group discussion. If the common set of data points indicates that the majority of the users in the corresponding social network group prefers content to be delivered in a video, the computing system may find content in video/audio format which is associated with the online social network group discussion, e.g., by querying one or more database or data warehouse with the keyword via SQL. The aggregation and the analysis (i.e., methods shown in FIGS. 2 and 4) identify the commonalities across a social network group. The computing system finds the tailored content and the preferred type based on the commonalities, e.g., by running an Internet search engine with a keyword representing one or more commonalities. The tailored content (in the preferred type), which is delivered to the group during the online social network group discussion, is appropriate to the entire group. All participants in the group may be viewing the same content at the same time during the online social network group discussion.

In one embodiment, the computing system further receives, e.g., from a database associated with a social network, data encoding a day and time when each social network posting is created by one or more users in that social network group. The computing system further receives ad-hoc (e.g., created on-the-fly without planning, etc.) subgroup data, e.g., from a database associated with the social network. The received subgroup includes, but is not limited to: data associated with each member in the subgroup in the social network group. When aggregating the received inputs, e.g., by running the method shown in FIG. 2, the computing system may aggregate these further received data with the inputs received at step 110 in FIG. 1. The computing system uses this aggregation (and the analysis shown in FIG. 4) to determine a delivery method (e.g., an email, etc.) for the tailored content, to advertise a product to the social network group and/or to encourage content consumption (e.g., receiving the tailored content in) to the group, e.g., by identifying the commonalities across the group.

The following describes an example scenario that uses methods shown in FIGS. 1-2 and 4 in order to suggest content to a social network group. Joe, Tom, Cathy, and Ruth begin an online group chat in a social network. Currently, it is 11:00 a.m., and they are discussing the possibility of going to lunch together. During the online group chat, they express interests in Chinese food, barbecue, and Indian food. While they are chatting in online, the computing system aggregates the group chat content, profiles of them, and history data of other interactions among them. By running methods shown in FIGS. 2 and 4 and/or a text mining technique, the computing system identifies that they are located in Raleigh, N.C. and that, previously, Joe, Tom, and Ruth enjoyed a meal at "Tandoor" restaurant (i.e., an Indian-Chinese buffet restaurant in Raleigh, N.C.). In this case, the computing system suggests the Indian-Chinese buffet restaurant, because the computing system determines that the majority of them enjoyed Tandoor restaurant. Based on commonalities identified by the aggregation and the analysis of the group chat content, the profiles and the history data, the computing system further determines that an audio-visual graphic is preferred by a majority of them, rather than a text, audio-only, or graphic-only representation. The computing system presents the restaurant suggestion (i.e., the Indian-Chinese buffet restaurant) in an audio-visual format, viewable by all the four users of the group chat.

Figure 3:
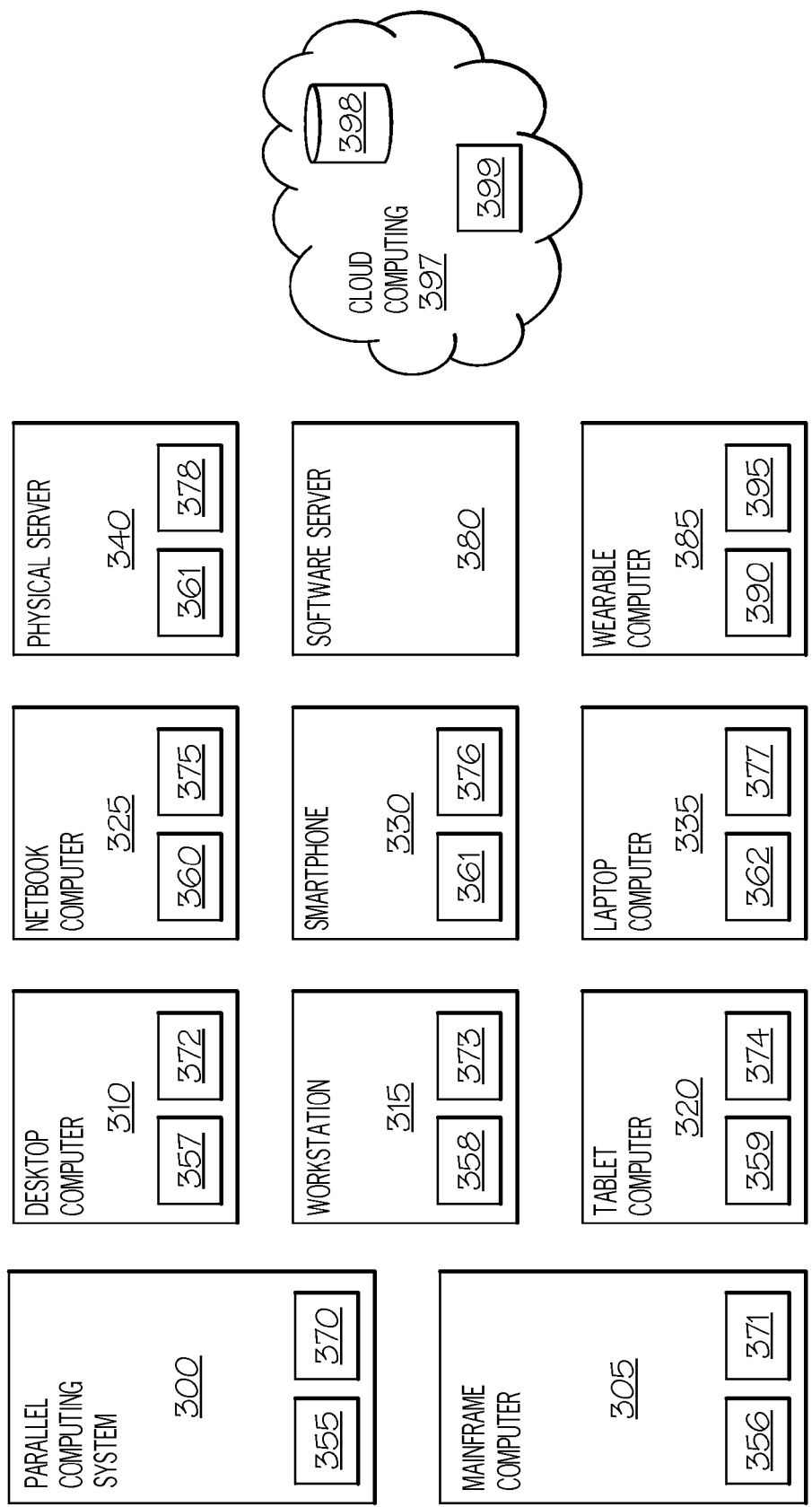
FIG. 3 illustrates exemplary hardware configurations for performing methods shown in FIGS. 1-2 in one embodiment.

In one embodiment, a computing system may run the method illustrated in FIGS. 1-2 and 4. FIG. 3 illustrates examples of the computing system. Examples of the computing system may include, but are not limited to: a parallel computing system 300 including at least one processor 355 and at least one memory device 370, a mainframe computer 305 including at least one processor 356 and at least one memory device 371, a desktop computer 310 including at least one processor 357 and at least one memory device 372, a workstation 315 including at least one processor 358 and at least one memory device 373, a tablet computer 320 including at least one processor 356 and at least one memory device 374, a netbook computer 325 including at least one processor 560 and at least one memory device 575, a smartphone 530 including at least one processor 361 and at least one memory device 376, a laptop computer 335 including at least one processor 362 and at least one memory device 377, a physical server 340 including at least one processor 361 and at least one memory device 378, a cloud computing system 397 including at least one storage device 398 and at least one server device 399, a software server 380, e.g., web server, HTTP server, application server, or a wearable computer 385, e.g., smartwatch, etc., including at least one processor 390 and at least one memory device 395.

In one embodiment, the methods shown in FIGS. 1-2 and 4 may be implemented as hardware on a reconfigurable hardware, e.g., FPGA (Field Programmable Gate Array) or CPLD (Complex Programmable Logic Device), by using a hardware description language (Verilog, VHDL, Handel-C, or System C). In another embodiment, the method shown in FIGS. 1-2 and 4 may be implemented on a semiconductor chip, e.g., ASIC (Application-Specific Integrated Circuit), by using a semi custom design methodology, i.e., designing a semiconductor chip using standard cells and a hardware description language.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A system for suggesting content to a group, the system comprising:
    a memory device;
    a processor connected to the memory device, wherein the processor is configured to perform:
    identifying a group of users in a social network participating in an active data stream;
    receiving inputs associated with the social network group, the inputs comprising postings by the users in the active data stream;
    aggregating the received inputs;
    analyzing the aggregated inputs as a whole and determining keywords that represent common interest of the users, the analyzing further determining a preferred content type of the users, the preferred content type of the users determined based on common set of data points in the aggregated inputs aggregated at least based on the postings by the users in the active data stream, the preferred content type of the users comprising at least one of an audio form, a video form, and literature form;
    searching, based on the aggregation and the analysis, for tailored content associated with the keywords, the tailored content to be delivered to the group in Internet, database and data warehouse;
    converting the tailored content to the preferred content type; and
    delivering the tailored content to the group in the social network.

2. The system according to claim 1, wherein the received inputs further comprise at least one input selected from a group consisting of:
    social network postings of one or more of the users in the group, which are stored in a server device hosting the social network;
    previous or real-time chat sessions of the one or more of the users in the group, which are stored in the server device hosting the social network;
    photographs of the one or more users in the group, which are stored in the server device hosting the social network;
    previous or real-time videos of the one or more users in the group, which are stored in the server device hosting the social network;
    profile data of the one or more of the users in the group, which are stored in the server device hosting the social network; and
    previous or real-time interaction data of the one or more of the users in the group, which are stored in the server device hosting the social network.

3. The system according to claim 1, wherein in order to perform the analyzing, the processor performs:
    classifying the aggregated inputs;
    identifying, based on the classification, a common interest, a common preference and a common need of the users; and
    further identifying, based on the classification, a common interest, a common preference and a common need of a majority of the users.

4. The system according to claim 1, wherein the processor further performs:
    identifying, based on the aggregation and the analysis, a content type which is preferred by the group and a majority of the group.

5. The system according to claim 4, wherein the processor further performs:
    transforming the tailored content to fit to the identified content type; and
    delivering the tailored content in the identified content type.

6. The system according to claim 1, wherein the processor further performs:
    dynamically changing the one or more users in the group; and
    dynamically updating, in real-time, the received input in order to reflect the dynamically changed users.

7. A computer program product for suggesting content to a group, the computer program product comprising a computer readable storage medium, the computer readable storage medium excluding a propagating signal, the computer readable storage medium readable by a processing circuit and storing instructions run by the processing circuit for performing a method, the method comprising:

identifying a group of users in a social network participating in an active data stream;

receiving inputs associated with the social network group, the inputs comprising postings by the users in the active data stream;

aggregating the received inputs;

analyzing the aggregated inputs as a whole and determining keywords that represent common interest of the users, the analyzing further determining a preferred content type of the users, the preferred content type of the users determined based on common set of data points in the aggregated inputs aggregated at least based on the postings by the users in the active data stream, the preferred content type of the users comprising at least one of an audio form, a video form, and literature form;

searching, based on the aggregation and the analysis, for tailored content associated with the keywords, the tailored content to be delivered to the group in Internet, database and data warehouse;

converting the tailored content to the preferred content type; and delivering the tailored content to the group in the social network.

8. The computer program product according to claim 7, wherein the received inputs further comprise at least one input selected from a group consisting of:

social network postings of one or more of the users in the group, which are stored in a server device hosting the social network;

previous or real-time chat sessions of the one or more of the users in the group, which are stored in the server device hosting the social network;

photographs of the one or more users in the group, which are stored in the server device hosting the social network;

previous or real-time videos of the one or more users in the group, which are stored in the server device hosting the social network;

profile data of the one or more of the users in the group, which are stored in the server device hosting the social network; and previous or real-time interaction data of the one or more of the users in the group, which are stored in the server device hosting the social network.

9. The computer program product according to claim 7, wherein the analyzing comprises:

classifying the aggregated inputs;

identifying, based on the classification, a common interest, a common preference and a common need of the one or more users; and further identifying, based on the classification, a common interest, a common preference and a common need of a majority of the one or more users.

10. The computer program product of claim 7, wherein the tailored content comprises content selected from the group consisting of: e-book, online magazine, online video, and online news articles.

\* \* \* \* \*